United States Patent [19]

Churchill et al.

[11] 4,101,702
[45] Jul. 18, 1978

[54] COMPOSITE SHEET MEMBER HAVING A PLURALITY OF COEXTRUDED LAMINAR LAYERS

[75] Inventors: Geoffrey B. Churchill, Wilbraham; J. Craig White, Feeding Hills, both of Mass.

[73] Assignee: Monsanto Company, St. Louis, Mo.

[21] Appl. No.: 843,185

[22] Filed: Oct. 18, 1977

[51] Int. Cl.$^2$ .............................................. B32B 7/00
[52] U.S. Cl. ............................ 428/213; 156/244.11; 260/880 R; 428/493; 428/519; 428/520; 428/522; 264/171
[58] Field of Search ............... 428/520, 519, 522, 493, 428/213; 260/880 R; 156/244

[56] References Cited

U.S. PATENT DOCUMENTS

| | | | |
|---|---|---|---|
| 3,509,238 | 4/1970 | Aubrey et al. | 260/880 R |
| 3,682,768 | 8/1972 | Adams et al. | 428/519 |
| 3,993,810 | 11/1976 | Bonis | 428/519 |

*Primary Examiner*—George F. Lesmes
*Assistant Examiner*—E. Rollins Buffalow
*Attorney, Agent, or Firm*—Joseph S. Nelson; William J. Farrington; James C. Logomasini

[57] ABSTRACT

The present invention relates to a composite sheet member having a plurality of coextruded laminar layers comprising a base layer having at least one exterior layer, said base layer being formed from a first polyblend of low grafted rubber content and said exterior layers being formed from a second polyblend having a higher grafted rubber content, said composite sheet having increased impact strength when impacted with a force through the base layer to the exterior layer.

21 Claims, No Drawings

COMPOSITE SHEET MEMBER HAVING A PLURALITY OF COEXTRUDED LAMINAR LAYERS

BACKGROUND OF THE INVENTION

Industrial requirements for tough plastic sheeting is accelerating because of the need to replace high energy metals and reduce the weight in fabricated products for appliances, automotive and building construction.

Filled materials have been developed for increased toughness and modulus, however, such approaches increase weight and costs because of compounding problems or brittleness requiring high cost plasticizers.

It has been found that particular composite sheet members having a plurality of coextruded laminar layers provide unexpectedly superior toughness yet are economically produced and fabricated.

Coextrusion of layered materials have been carried out in pipe fabrication wherein a foamed core material has been coextruded between skins of solid wall material to reduce weight. Various sheets or films have been coextruded to produce barrier or heat sealing skins. Hence, coextrusion processes are known and coextrusion equipment is commercially available.

Hence, the object of the present invention is to prepare coextruded laminar sheet members that can be formed for appliances or automotive parts wherein the laminar layers are particular layers that in combination provide unexpectedly tough sheet members with a superior combination of properties.

In particular, it has been found that composite sheet members having a plurality of coextruded laminar layers prepared from polyblends can be varied in toughness depending upon the amount and kinds of grafted rubber dispersed in the base and external layers along with the geometry of said layers.

SUMMARY OF THE INVENTION

The present invention relates to a composite sheet having a plurality of coextruded laminar layers comprising:
A. a base layer formed from a first polyblend having a thickness of about 55 to 99% of the thickness of said composite sheet member, said first polyblend having a grafted diene rubber content of 2 to 15% by weight of said polyblend and at least one,
B. external layer formed from a second polyblend having a thickness of 1 to 45% of the thickness of said composite sheet member said second polyblend having a grafted diene rubber content of 5 to 35% by weight of said second polyblend, said external layer having present at least about 10% more grafted rubber than said base layer.

PREFERRED EMBODIMENTS

The ABS polyblends can be prepared by the processes disclosed in U.S. Pat. Nos. 3,509,237 and 3,509,238. The high impact polystyrene polyblends (HIPS) can be prepared by the process disclosed in U.S. Pat. No. 3,903,202. The patents are incorporated by reference.

THE ABS POLYBLENDS

The interpolymers of the present invention of both the matrix and the graft superstrates consist at least principally of a monovinylidene aromatic hydrocarbon and an unsaturated nitrile, i.e., such monomers comprise at least 50.0 percent by weight and preferably at least 75.0 percent by weight of the interpolymers. Most desirably, such monomers comprise at least 90.0 percent by weight of the interpolymer and the usual commercial compositions are substantially completely comprises of such monomers although minor amounts, i.e., less than 5.0 percent by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolyers are acrylonitrile, methacrylonitrile, ethacrylonitrile and mixtures thereof.

Exemplary of the monomers which may be interpolymerized with the monovinylidene aromatic hydrocarbons and unsaturated nitriles are conjugated 1,3 dienes, e.g., butadiene, isoprene, etc.; alpha-or beta-unsaturated monobasic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 50% by weight of the monovinylidene aromatic monomer and preferably at least 60% by weight thereof. They also contain at least 5% by weight of the unsaturated nitrile and preferably at least 15% by weight thereof. From the standpoint of highly advantageous commercial practice, the monomer formulations contain 50 to 95% and preferably 50 to 85%, by weight of the vinylidene aromatic hydrocarbon and 50 to 5%, and preferably 15 to 50%, by weight of the unsaturated nitrile.

The Matrix

As is well known in the art, the polyblend is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber and the conditions of polymerization. Generally, interpolymers prepared without the inclusion of rubber will be compounded with material from the graft polymerizareactions to obtain the desired composition.

Any of the usual polymerization processes may be used to effect polymerization of the ungrafted superstrate, i.e., mass suspension and emulsion, or combinations thereof. Such techniques are well known and are also described herein with respect to the graft copolymerization reactions.

The Rubber Substrate

Various rubbers onto which the interpolymer may be grafted during the polymerization in the presence thereof are utilizable as the substrate of the graft copolymer including diene rubbers, ethylenepropylene rubbers, acrylate rubbers, polyisoprene rubbers and mixtures thereof as well as interpolymers thereof with each other or other copolymerizable monomers.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated 1,3 dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene); an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2% of a crosslinking agent, based on the weight of the rubber-forming monomer or monomers, crosslinking may present problems in dissolving the rubber in the monomers for the graft polymerization reaction, particularly for a mass or suspension polymerization reaction. In addition, excessive crosslinking can result in loss of the rubbery characteristics. The crosslinking agent can by any of the agents conventionally employed for crosslinking diene rubbers, e.g., divinylbenzene, diallyl maleate, diallyl fumarate diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene.

Various techniques are customarily employed for polymerizing rubber monomers including mass, suspension and emulsion polymerization. Emulsion polymerization can be used to produce a latex emulsion which is useful as the base for emulsion polymerization of the graft copolymer.

GRAFT POLYMERIZATION PROCESS

The graft copolymers are prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 70–150:100. With graft ratios above 30:100, a highly desirable degree of improvement in various properties generally is obtained.

To minimize requirements for separate equipment, the same process of polymerization desirably may be utilized to prepare both sizes of rubber graft components, as well as ungrafted interpolymer or crystal for use as the matrix when required. Generally, the particle sizes of the graft copolymer can be varied by varying the size of the rubber substrate employed. For example, a rubber latex which will usually have a relatively small particle size, i.e., less than about 0.2 micron, may be creamed through the use of polyvalent metal salts to obtain agglomeration or coagulation of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymers may be utilized to vary the size of the particles thus produced.

Chain transfer agents or molecular weight regulators also exhibit an effect upon the size of the graft copolymer produced, particularly in mass and suspension polymerization reactions. The effect of the rate of addition of chain transfer agents will be referred to hereinafter. The viscosity of the polymerizing mixture also tends to affect the condensate particle size of the polymers.

To some extent, crosslinking and the ratio of the superstrate to substrate in the graft copolymer tend to affect the particle size of the graft copolymers by reason of an apparent tendency for the particles to aggregate or agglomerate as the amount of grafting and/or crosslinking becomes minor.

The graft copolymer particles produced in various polymerization processes may be agglomerated through various techniques in the recovery thereof such as during the coagulation and/or dewatering techniques. Heat and other conditions of polymerization such as catalysts monomer ratios, rate of addition of monomers, etc., also tend to affect the particle size of the graft copolymers produced thereby.

However, different polymerization techniques may be utilized to produce the two different sizes of graft copolymer particles by reliance upon inherent process characteristics. In practice, it has been found desirable to utilize an emulsion polymerization process to form the smaller graft particles and a mass-suspension polymerization process to form the larger particles since highly spherical particles are produced within a relatively narrow size range. Generally, the graft copolymerization inherently produces crosslinking, and this may be enhanced by selection of process conditions to ensure discreteness of the graft copolymer particles.

It will be appreciated that both the large and small particle graft copolymer components may be provided by mixtures of two or more separately formed graft copolymers of distinctive properties to vary still further the benefits of the present invention. For example, the small particle graft copolymer may be a cocoagulation of two different graft copolymer latices having different superstrate to substrate ratios, or the large particle graft copolymers may be formed by two different suspension products with varying superstrate to substrate ratios.

The emulsion grafted diene rubbers have an average particle size diameter of about 0.005 to 0.30 microns, preferably 0.01 to 0.25 microns, most preferably 0.10 to 0.20 microns. If the rubber particles are agglomerated before grafting the average particle size diameter can be increased to 0.30 to 0.80 microns in size and then grafted and stabilized at that size range. The mass-suspension prepared grafted rubber particles have an average particle size diameter of 0.80 to 2.0 microns, preferably 0.90 to 1.5 microns. It has been found that the mass polymerized grafted rubber particles have occluded interpolymer inside the rubber particle as well as grafted interpolymer superstrate. The combined occluded and grafted interpolymer can be from 0.1 to 5 parts per part of rubber whereas the grafted superstrate is contained in amounts of from about 0.10 to 2.5 parts per part of rubber.

FORMATION OF THE ABS POLYBLEND

The polyblends can be blends of the emulsion grafted rubber copolymer particles with matrix interpolymer or blends of mass-suspension grafted rubber copolymer particles with matrix interpolymer. A third type of blend can be used wherein two different emulsion grafted rubber copolymers having different amounts of grafted superstrate are blended with matrix interpolymers as in U.S. Pat. No. 3,509,238. The polyblends can also be blends of the emulsion grafted rubber particles with mass-suspension grafted particles which are then blended with matrix interpolymer to form polyblends as in U.S. Pat. No. 3,509,237. The polyblends can be prepared by dry blending the grafted rubber copolymers with the matrix interpolymers followed by melt colloiding in an extruder, banbury or roll mill at temperatures of 400° to 500° F. (205° to 260° C.).

The ABS polyblends can contain 1.0 to 70% of the grafted rubber copolymers based on the weight of the polyblend depending on the physical properties desired in the sheet member. The base layer of the sheet member is prepared from a low rubber content ABS polyblend having a grafted rubber content of 5 to 25%. This gives the base sheet a higher modulus for improved stiffness. Such base sheets suffer in toughness, however, having lower impact strength. The external layers are prepared from a higher grafted rubber content ABS polyblend to provide toughness for the composite sheet member. The external layer can be a single coextruded layer having 7 to 35% by weight of the grafted rubber phase in the ABS polyblend, said external layer having present 10 to 500% more grafted rubber phase than said base layer, preferably 50 to 200%.

HIPS POLYBLENDS

The high impact polystyrene polyblends (HIPS) can be prepared by the process disclosed in U.S. Pat. No. 3,903,202.

POLYMERIZABLE MONOMER COMPOSITION

The monomer composition charged to the first reaction zone comprises at least one monoalkenyl aromatic monomer of the formula

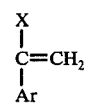

where Ar is selected from the group consisting of phenyl, halophenyl alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-dimethyl-2,5-di-(tert-butylperoxy) hexane, 2,5-dimethyl-2,5-di(tert-butylperoxy) hexane-3 or hexyne-3, tert-butyl hydroperoxide, cumene hydroperoxide, p-methane hydroperoxide, cyclopentane hydroperoxide, pinane hydroperoxide, 2,5-dimethylhexane, 2,5-dihydroperoxide, etc., and mixtures thereof.

The catalyst is generally included within the range of 0.001 to 3.0% by weight, and preferably on the order of 0.005 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers and mixtures thereof, as well as interpolymers thereof with each other or other copolymerizable monomers.

The preferred substrates, however, are diene rubbers (including mixtures of diene rubbers), i.e., any rubber polymer (a rubbery polymer having a second order transition temperature not higher than 0° centigrade, preferably not higher than −20° centigrade, as determined by ASTM Test D-746-52T) of one or more of the conjugated, 1,3 dienes, e.g. butadiene, isoprene, 2-chloro-1,3-butadiene, 1 -chlorol,3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0% of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3-butadiene. These rubbers have a cis-isomer content of about 30–98% and a trans-isomer content of about 70-2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° to −105° C. as determined by ASTM Test D-746-52T.

GRAFTED RUBBER PHASE

A monomer composition comprising at least one monoalkenyl aromatic monomer having about 2–20% by weight of a diene rubber dissolved therein is charged continuously as a monomer-rubber solution to the initial reaction zone. The monomer is polymerized at temperatures of about 110°–145° C. in the first zone converting about 10–50% by weight of the monomer to a alkenyl aromatic polymer, already described, as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomerpolymer solution. The monomer-polymer solution or phase is inincompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15% by weight diene rubber disperses almost instantaneously, under stirring, forming the rubber-monomer particles which on complete polymerization form discrete rubber particles. The conversion of monomers to polymers in the first reaction zone is controlled between 10-50% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 20% as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J. et.al., "Size Analysis of Subsieve Powders Using a Centrifugal Photosedimentometer", British Chemical Engineering 9:742–744 (1964). A model 3000 Particle Size Analyzer from Martin Sweets Co., 3131 West Market Street, Louisville, Kentucky was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture of a monomer-polymer phase having the rubber phase described dispersed therein. The first mixture is charged to a staged isobaric stirred reaction zone as a second zone and described above. The first mixture is polymerized by progressive multistage substantial linear flow polymerizations with the conversion of polymer advancing from about 10–50% conversion in the first stage to 50 to 90% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found unexpectedly that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the outside. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone and the percent by weight of polymer being formed is progressively higher with each stage having a slightly higher polymer content. The staged liner progressive polymerization was found not only to control the polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry Gel in Polyblend} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber}^*} \times 100$$

$$\left.\begin{array}{l}\text{Parts}^{**} \text{ by weight} \\ \text{of graft polymer} \\ \text{and occluded polymer per unit weight} \\ \text{of rubber}\end{array}\right\} = \frac{\% \text{ dry gel} - \% \text{ rubber}}{\text{Percent rubber}}$$

*Percent rubber determined by infra red spectrochemical analysis of the dry gel
**The present invention preferably has present about 0.5 to 5 grams of occluded and grafted polymer per gram of the diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C., and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

EXAMPLES

EXAMPLE 1

Coextrusion apparatus available from Johnson Plastic Machinery, 1600 Johnson Street, Chippewa Falls, Wisconsin was used to form composite sheet members. A sheet member of 0.100 inches in thickness (0.25 cm) was prepared having a base layer of 0.090 inches (0.225 cm) and top and bottom external layers of 0.005 inches (0.0125 cm). The base layer was formed from a first ABS/polyblend having about 10% grafted rubber and the external layers were formed from a second ABS polyblend having about 23% grafted rubber. The sheet member was tested and found to have a falling dart impact strength (FDI) (ASTM D256) strength of 55 foot pounds (7.7 kgm).

EXAMPLES 2 AND 3

Single component sheets were extruded from the first and second ABS polyblends having 0.100 inch thickness (0.25 cm) and tested by FDI tests. The single sheet from the first ABS polyblend had a FDI strength of 30 ft.lbs. (4.2 kgm) whereas the single sheet from the second ABS polyblend had a FDI strength of 82 ft.lbs. (11.48 kgm). It is evident that the impact strength of the composite sheet was about 83% greater than the base sheet with only about 10% of its thickness of the composite member being contributed by the layers of high rubber ABS polyblend providing an unexpectedly higher impact strength for the composite member sheet.

EXAMPLE 4

A composite sheet member was extruded having a base layer of 0.090 inches (0.225 cm) in thickness from the first low rubber ABS polyblend and a single exterior layer of 0.010 inches (0.25 cm) of the second high rubber ABS polyblend. FDI impact values for the composite member were found to be about 55 ft.lbs. (7.7 kgm) when impacted on the base layer side of the composite member. When the composite member was impacted on the exterior layer side the member was found to have a FDI of about 30 ft.lbs. (4.2 kgm).

EXAMPLE 5

A composite sheet was extruded with the base layer of 0.090 inches in thickness (0.225 cm) formed from the high rubber ABS polyblend and external layers of 0.005 inches (0.0125 cm) being formed of low rubber content ABS polyblend. FDI tests of the composite sheet had a value of 36 ft.lbs. (5.04 kgm). It is evident that the composite sheet member must be fabricated with the higher rubber content ABS as an external layer to provide improved impact strength for the composite sheet.

EXAMPLE 6

Example 1 was repeated using a first HIPS polyblend of about 5% grafted diene rubber and a second HIPS polyblend of about 10% grafted diene rubber. The sheet member was tested and found to have a falling dart impact of about 37 ft.lbs. (5.2 kgm).

EXAMPLES 7 AND 8

Examples 2–3 were repeated wherein single sheets of the first HIPS polyblend and the second HIPS polyblend were formed and tested. The sheet from the first HIPS polyblend had a FDI of 25 ft.lbs. (3.5 kgm) and the sheet from the second HIPS polyblend had a FDI of about 50 ft.lbs. (7.0 kgm).

It has been found that the base layer can be extruded from a first HIPS polyblend having about 2 to 15% by weight of a grafted diene rubber preferably 2 to 10% by weight of said polyblend. The external layers are coextruded from a second HIPS polyblend having 3 to 20% of said grafted diene rubber preferably 5 to 15%.

In the case of ABS composite sheet members, the base layer is formed from a first ABS polyblend having about 5 to 25% by weight of grafted diene rubber preferably 5 to 15% by weight. The external layers are coextruded from a second ABS polyblend having 7 to 35% by weight of said grafted diene rubber preferably 10 to 30%.

To optimize the toughness of the composite sheet member the external layers contain at least 10% more grafted rubber phase than the base layer. The grafted rubber phase of the external layers can have 10 to 500% more grafted rubber phase than the base layer preferably 50 to 200%.

In coextrusion of composite sheets the melt flow index of (ASTM D-1238) of the first and second polyblend of either ABS or HIPS preferably should be substantially equal to insure optimum coextrusion and adhesion at the melt interface formed during extrusion. Melt flow differentials between the first and second polyblends can be accommodated with ratios of 1:1 to 3:1, however, with temperature adjustments during coextrusion.

The composite sheet member comprises a base layer having at least one external layer or a top and bottom layer as external layers. Said external layers have preferably a thickness of about 0.5 to 22.5% of the thickness of said composite sheet member, said external layers can have thickness ranging as high as 22.5 to 50% of the composite sheet member if greater toughness is desired consistent with the stiffness of the composite sheet desired. If one external layer is used its thickness can be 1 to 50% of the thickness of said composite sheet member.

What is claimed is:

1. A composite sheet member having a plurality of coextruded laminar layers comprising:
   A. a base layer formed from a first ABS polyblend having a thickness of about 55 to 99% of the thickness of said composite sheet member, said first polyblend having a grafted diene rubber content of 5 to 25% by weight of said polyblend and at least one,
   B. external layer formed from a second ABS polyblend having a thickness of 1 to 45% of the thickness of said composite sheet member said second polyblend having a grafted diene rubber content of 7 to 35% by weight of said second polyblend, said external layer having present at least about 10% more grafted rubber than said base layer.

2. A sheet member of claim 1 wherein said first ABS polyblend has a melt flow substantially that of second ABS polyblend.

3. A sheet member of claim 1 wherein said base and external layers have adhesion at a melt interface formed during coextrusion.

4. A sheet member of claim 1 wherein said external layer has a thickness of 1 to 50% of the thickness of said composite sheet member.

5. A sheet member of claim 1 wherein said base layer has a bottom external layer and a top external layer.

6. A sheet member of claim 5 wherein said bottom and top layers are formed from said second polyblend.

7. A sheet member of claim 5 wherein said bottom and top layers have a thickness of 0.5 to 22.5% of the thickness of said composite sheet member.

8. A sheet member of claim 1 wherein said first and second polyblend are ABS polyblends having a matrix interpolymer comprising about 50 to 85% of a monovinylidene aromatic monomer by weight and about 15 to 50% of a ethylenically unsaturated nitrile monomer by weight, a diene rubber substrate having a grafted superstrate interpolymer of the composition of said matrix interpolymer, said grafted superstrate interpolymer being present in amounts of 0.1 to 2.5 parts per part of rubber.

9. A sheet member of claim 8 wherein said monovinylidene aromatic monomer is styrene, alpha-methylstyrene, chlorostyrene or bromostyrene, said ethylenically unsaturated nitrile is acrylonitrile or methacrylonitrile.

10. A sheet member of claim 1 wherein said diene rubber is polybutadiene, copolymers of butadiene/styrene or butadiene/acrylonitrile, chloroprene, isoprene or mixtures thereof, said diene rubber having at least 50% of a conjugated diene monomer present.

11. A composite sheet member having a plurality of coextruded laminar layers comprising:
   A. a base layer formed from a first HIPS polyblend having a thickness of about 55 to 99% of the thickness of said composite sheet member, said first polyblend having a grafted diene rubber content of 2 to 15% by weight of said polyblend and at least one,
   B. external layer formed from a second HIPS polyblend having a thickness of 1 to 45% of the thickness of said composite sheet member said second polyblend having a grafted diene rubber content of 3 to 20% by weight of said second polyblend, said external layer having present at least about 10% more grafted rubber than said base layer.

12. A sheet member of claim 10 wherein said first and second HIPS polyblends are polymers of a monovinylidene aromatic monomer having dispersed therein a diene rubber grafted with said monomer.

13. A sheet member of claim 11 wherein said diene rubber is polybutadiene, copolymers of butadiene/styrene or butadiene/acrylonitrile, chloroprene, isoprene or mixtures thereof, said diene rubber having at least 50% of a conjugated diene monomer present.

14. A sheet member of claim 11 wherein said grafted diene rubber has grafted and occluded polystyrene present in amounts of 0.1 to 5 parts per part of rubber.

15. A sheet member of claim 11 wherein said monovinylidene aromatic monomer is styrene, alpha-methylstyrene, chlorostyrene or bromostyrene.

16. A sheet member of claim 11 wherein said first HIPS polyblend has a melt flow substantially that of second HIPS polyblend.

17. A sheet member of claim 11 wherein said base and external layers have adhesion at a melt interface formed during coextrusion.

18. A sheet member of claim 11 wherein said external layer has a thickness of 1 to 50% of the thickness of said composite sheet member.

19. A sheet member of claim 16 wherein said base layer has a bottom external layer and a top external layer.

20. A sheet member of claim 16 wherein said bottom and top layers are formed from said second polyblend.

21. A sheet member of claim 16 wherein said bottom and top layers have a thickness of 0.5 to 22.5% of the thickness of said composite sheet member.

* * * * *